(12) United States Patent
Chang et al.

(10) Patent No.: US 7,225,985 B2
(45) Date of Patent: Jun. 5, 2007

(54) OPTICAL SCANNER

(76) Inventors: Wen-Yuan Chang, No. 430, Hsita Rd., Hsinchu (TW); Jen-Shou Tseng, No. 18, Wen-Shen St., Chunan Chen, Miao-Li Hsien (TW)

( * ) Notice: Subject to any disclaimer, the term of this patent is extended or adjusted under 35 U.S.C. 154(b) by 169 days.

(21) Appl. No.: 10/604,343

(22) Filed: Jul. 14, 2003

(65) Prior Publication Data
US 2005/0011951 A1    Jan. 20, 2005

(30) Foreign Application Priority Data
Jul. 22, 2002    (TW) .............................. 91116234 A

(51) Int. Cl.
*G06K 7/10* (2006.01)
(52) U.S. Cl. ...................... 235/454; 235/475
(58) Field of Classification Search ........... 235/472.01, 235/462.01, 462.33, 462.43, 454, 494, 483, 235/479, 475
See application file for complete search history.

(56) References Cited

U.S. PATENT DOCUMENTS

| | | | | |
|---|---|---|---|---|
| 4,609,818 A | * | 9/1986 | Lennemann et al. ........ 250/234 |
| 5,175,420 A | * | 12/1992 | Bianco .................. 235/462.33 |
| 5,345,431 A | * | 9/1994 | Oliver et al. ............ 369/13.18 |
| 5,864,130 A | * | 1/1999 | Kahn et al. ............ 235/462.01 |
| 6,084,824 A | * | 7/2000 | Farr ........................... 365/234 |
| 6,305,608 B1 | * | 10/2001 | Nada et al. ............ 235/472.03 |
| 6,318,836 B1 | * | 11/2001 | Hasegawa et al. ............ 347/33 |
| 6,382,858 B1 | * | 5/2002 | Nojima et al. ............... 400/691 |
| 6,471,202 B1 | * | 10/2002 | Sugimura ................ 271/10.11 |
| 6,612,681 B2 | * | 9/2003 | Hasegawa et al. ............ 347/22 |
| 6,626,360 B2 | * | 9/2003 | Huang ........................ 235/454 |

* cited by examiner

*Primary Examiner*—Thien M. Le
(74) *Attorney, Agent, or Firm*—Berkeley Law & Technology Group LLP

(57) ABSTRACT

An optical scanner is provided with a carrier, a casing, a driving unit and a transmission unit. The carrier has a connecting unit and an optical system mounted thereon. The casing has a guiding rail formed as integral unit on the interior wall. The guiding rail has at least a fastener for latching onto the connecting unit of the carrier. The transmission unit links up the driving unit and the carrier. The driving unit drives the transmission unit and then the transmission unit pulls the carrier along the guiding rail through the linkage between the connecting unit and the fastener.

17 Claims, 9 Drawing Sheets

OPTICAL SCANNER

CROSS REFERENCE TO RELATED APPLICATIONS

This application claims the priority benefit of Taiwan application serial no. 91116234, filed Jul. 22, 2002.

BACKGROUND OF INVENTION

1. Field of the Invention

The present invention relates to an optical scanner. More particularly, the present invention relates to an optical scanner having a latched carrier capable of sliding along a guide rail.

2. Description of the Related Art

Most optical scanners operate by projecting light from a light source onto a scan document so that the reflected light is transmitted via a set of reflecting mirrors and a lens to a charge couple device (CCD). Finally, the image picked up by the CCD is converted into digital signals for further reading. Together, the set of reflecting mirrors, the lens and the optical sensor (that is, the charge couple device) are commonly referred to as an optical system.

Aside from lining the optical sensor in one horizontal direction, most optical scanners have a carrier with an optical system thereon. Through the sliding motion of the carrier, the optical system moves (along a vertical direction) to carry out a document scanning operation and obtain a two-dimensional planar image.

In a conventional scanner, a guide rail passes through the carrier so that the carrier is free to move along the guide rail. However, this type of structural design often leads to a number of problems that are described in more detail below. FIG. 1 is a top view (wit the top casing removed) of a conventional optical scanner. FIG. 2 is a front view of the scanner in FIG. 1. FIG. 3 is a cross-sectional view of the scanner in FIG. 1.

As shown in FIG. 1, the carrier 102 of a conventional scanner 100 has a pair of axle sheaths 104. The passage of a guiding rail 106 through the axle sheaths 104 of the carrier 102 constrains the carrier 102 to move along the guiding rail 106. In general, the guiding rail 106 is fabricated using metal. An optical system (not shown) is mounted on the carrier 102. Here, the upper portion of the casing 108b is removed to display the relationship between the carrier 102 and the guiding rail 106 of the optical scanner 100 within the lower casing 108a.

In FIG. 2, the guiding rail 106 is attached to base stands located within the lower casing 108a of the optical scanner 100. To fix the guiding rail 106 onto the pair of base stands, a hole is drilled in each of the base stand 120. Thereafter, one end of the guiding rail 106 is fastened to one base stand 120 via a rivet 110a while the other end of the guiding rail 106 is fastened to another base stand 120 using a screw 110b.

Transmission of the carrier 102 is achieved through an electric motor 112 driving a transmission belt 114. The carrier 102 is able to move through the action of the belt 114 linked to a latch 116 on one side of the carrier 102. On the other end of the carrier 102 (the far side of the guiding rail 106), movement is supported by a roller 118 pinned to the carrier 102.

However, the structural layout of the aforementioned optical scanner has the following drawbacks.

1. Demand on assembling tolerance leading to an increase in labor hour: the base stands 120 in the lower casing 108a need to be drilled and the ends of the guiding rail 106 need to be fastened to the respective base stands 120. Hence, the number of steps for assembling the guiding rail 106 is increased in addition to consider a tolerance between the two.

2. The guiding rail may drop off during site tests: because only one end of the guiding rail 106 is firmly tightened. Hence, an environmental testing (such s shock or drop test) may cause the guiding rail 106 to drop.

3. A constant distance of separation between the scan document and the optical system is hard to maintain: because the carrier 102 is fastened to the base stands 120 in the lower casing 108a while the document is placed on a platform above the upper casing 108b. Hence, the assembly in the upper casing 108b will directly affect the distance of separation between the optical system on the carrier 102 and the scan document.

In brief, major drawbacks of a conventional optical scanner includes: more tolerance-demand for assembly, large number of assembling steps, possible dropping of the guiding rail after a site test and difficulty in maintaining a constant separation between the optical system and the scan document.

SUMMARY OF INVENTION

Accordingly, one object of the present invention is to provide an optical scanner capable of reducing the demand of assembling tolerance and the number of assembling steps so that the manufacturing cost can be reduced.

A second object of this invention is to provide an optical scanner capable of preventing possible drop of guiding rail during an on site testing so that the problems associated with the dropping of guiding rail can be effectively resolved.

A third object of this invention is to provide an optical scanner capable of maintaining a constant distance of separation between an optical system on a carrier and a scan document so that a higher quality scan image is achieved.

To achieve these and other advantages and in accordance with the purpose of the invention, as embodied and broadly described herein, the invention provides an optical scanner. The optical scanner comprises a carrier, a casing, a driving unit and a transmission unit. The carrier has a connecting unit. In addition, an optical system is set on the carrier. The casing has a guiding rail formed as an integral unit with the interior sidewall of the casing. The guiding rail has at least a fastener for latching with the connecting unit of the carrier. The driving unit and the carrier are linked together through the transmission unit. The driving unit drives the transmission unit so that the transmission unit is able to pull the carrier along the guiding rail via the connection between the connecting unit on the carrier and the fastener on the guiding rail.

In this invention, a soft and grind-resistant material is used to fabricate the casing. The section extending from the casing to the guiding rail has a U shape and the interior sidewall of the U-shaped opening may further include a plurality of rib section for connecting the two ends of the U-shaped section (the sidewalls of the opening) so that the casing and the guiding rail is strengthened.

Aside from forming the guiding rail as an integral unit with the casing, a soft and grind-resistant material can be used to fabricate the guiding rail individually. In addition, at least a slide fastener is formed on the guiding rail and at least a base fastener is formed at each end of the guiding rail.

Correspondingly, at least two fixed sections are formed on the interior sidewalls of the casing. The base fastener latches onto the fixed sections of the casing. Meanwhile, the slide fastener latches with the connecting unit on the carrier.

One aspect of this invention is that assembling the carrier using a fastener is able to reduce the number of assembling steps and the demand on assembling tolerance. Hence, considerable labor and production cost is saved.

Another aspect of this invention is that the guiding rail is formed as an integral unit together with the casing so that the number of assembling step and the demand on assembling tolerance is further reduced. Consequently, some labor and production cost is saved.

Still another aspect of this invention is that the guiding rail is formed as an integral unit with the casing. Hence, the possibility of the guiding rail dropping from the casing due to on-site testing is greatly minimized. In the conventional scanner where only one end of the guiding rail is screwed to a base stand making it more vulnerable to dislodge and drop off under an influence of a shock.

Still another aspect of this invention is that the guiding rail is formed on the interior sidewalls of the casing (comprising an upper casing and a lower casing) rather than just on bottom section of the lower casing. Furthermore, the guiding rail may form on the top section of the upper casing body or on the side of both the upper casing and the lower casing. When the guiding rail is formed on the upper casing, a constant distance between the carrier and a scan document can be maintained. Ultimately, quality of the scanned images is improved.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
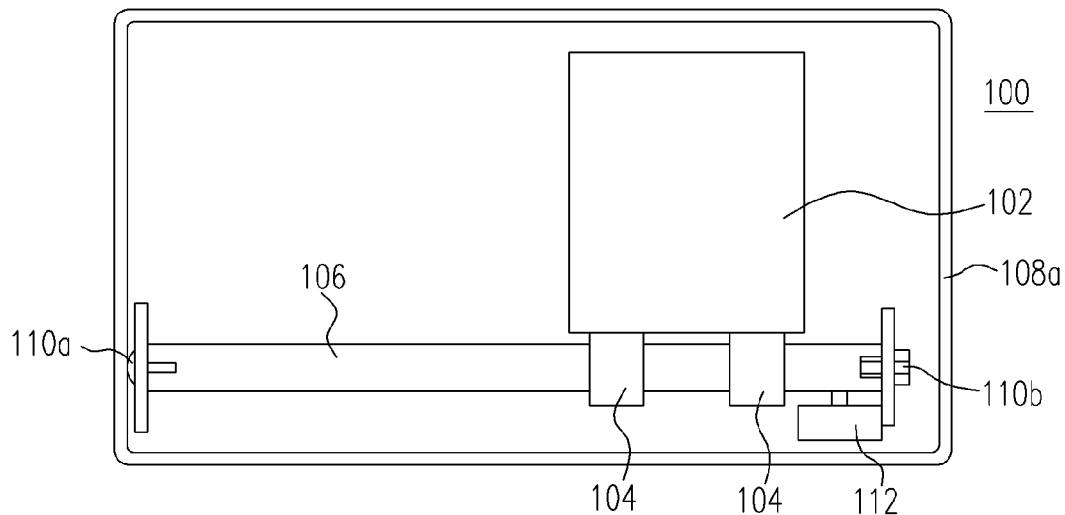
FIG. 1 is a top view (with the top casing removed) of a conventional optical scanner.
Figure 2:
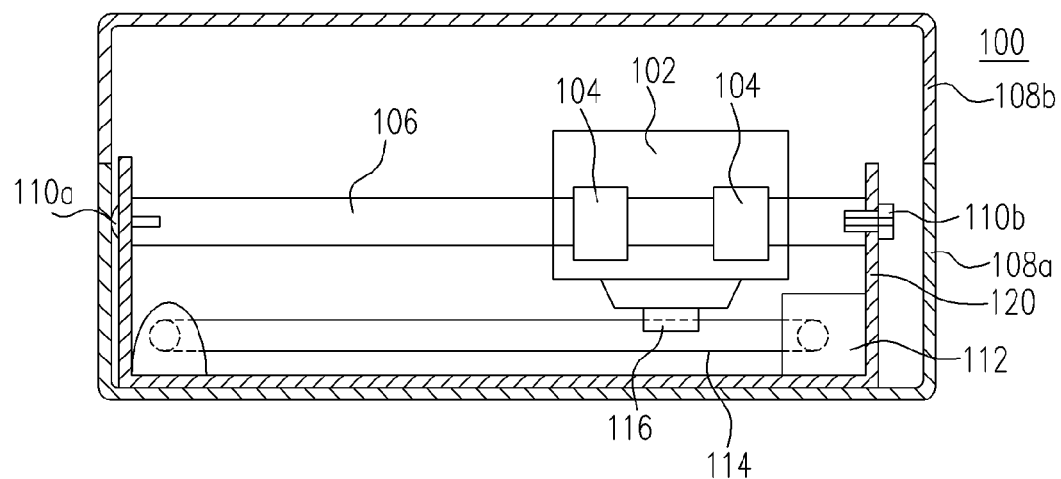
FIG. 2 is a front view of the scanner in FIG. 1.
Figure 3:
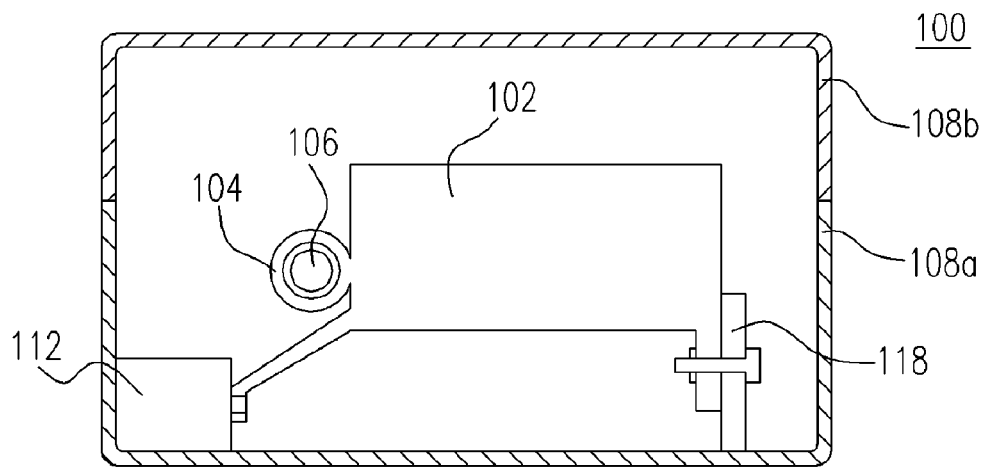
FIG. 3 is a cross-sectional view of the scanner in FIG. 1.

Reference will now be made in detail to the present preferred embodiments of the invention, examples of which are illustrated in the accompanying drawings. Wherever possible, the same reference numbers are used in the drawings and the description to refer to the same or like parts.

[The First Embodiment]

Figure 4:
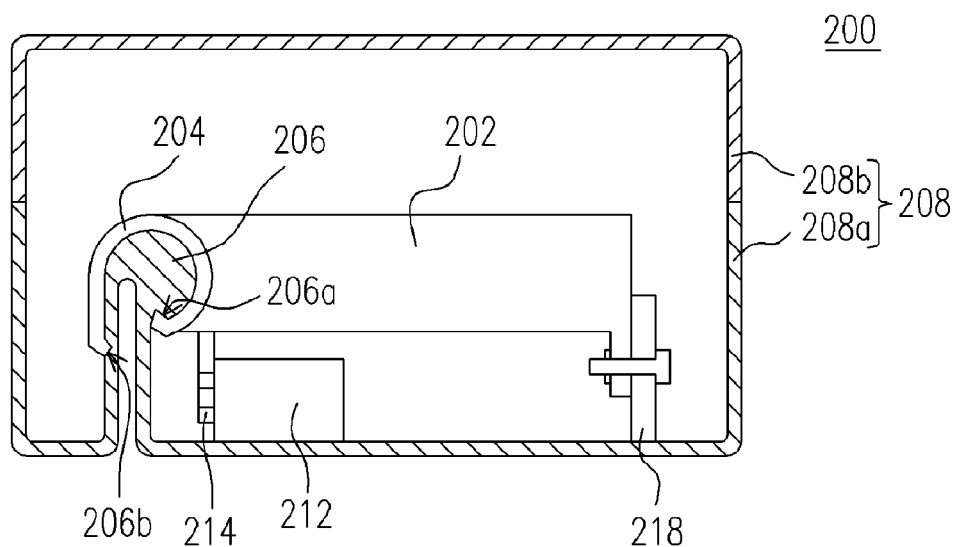
FIG. 4 is a cross-sectional view of an optical scanner according to a first preferred embodiment of this invention.

FIG. 4 is a cross-sectional view of an optical scanner according to a first preferred embodiment of this invention. As shown in FIG. 4, the optical scanner 200 comprises a carrier 202, a casing 208, a driving unit 212 and a transmission unit 214. The carrier has a connecting unit 204. Furthermore, an optical system (not shown) is set up on the carrier 202. The optical system comprises at least a set of reflecting mirrors, a lens and an optical sensor. The optical sensor can be a charge couple device (CCD), for example.

The casing 208 comprises an upper casing 208b and a lower casing 208a. The casing 208 has an attached guiding rail 206. The guiding rail 206 is formed as an integral unit with the interior sidewall of the casing 208. The guiding rail 206 has at least a fastener. Preferably, the guiding rail 206 includes a pair of fasteners 206a and 206b for latching with the connecting unit 204 of the carrier 202.

The driving unit 212 can be an electric motor, for example. The transmission unit 214 links up the driving unit 212 with the carrier 202. The transmission unit 214 is a belt, for example. The driving unit 212 drives the transmission unit 214 so that one end of the carrier 202 is able to slide along the guiding rail through the linkage between the connecting unit 204 of the carrier 202 and the fasteners 206a, 206b of the guiding rail 206. The other end of the carrier 202 (the end far from the guiding rail 206) moves together with the end described above through a supporting roller 218 (or a supporting device capable of moving along with the carrier 202).

In this embodiment, a soft and grind-resistant material is selected to fabricate the casing 208. Possible material for fabricating the casing 208 includes polycarbonate resin, nylon, polyoxymethylene (POM) or polybutylene terephthalate (PBT).

Figure 5:
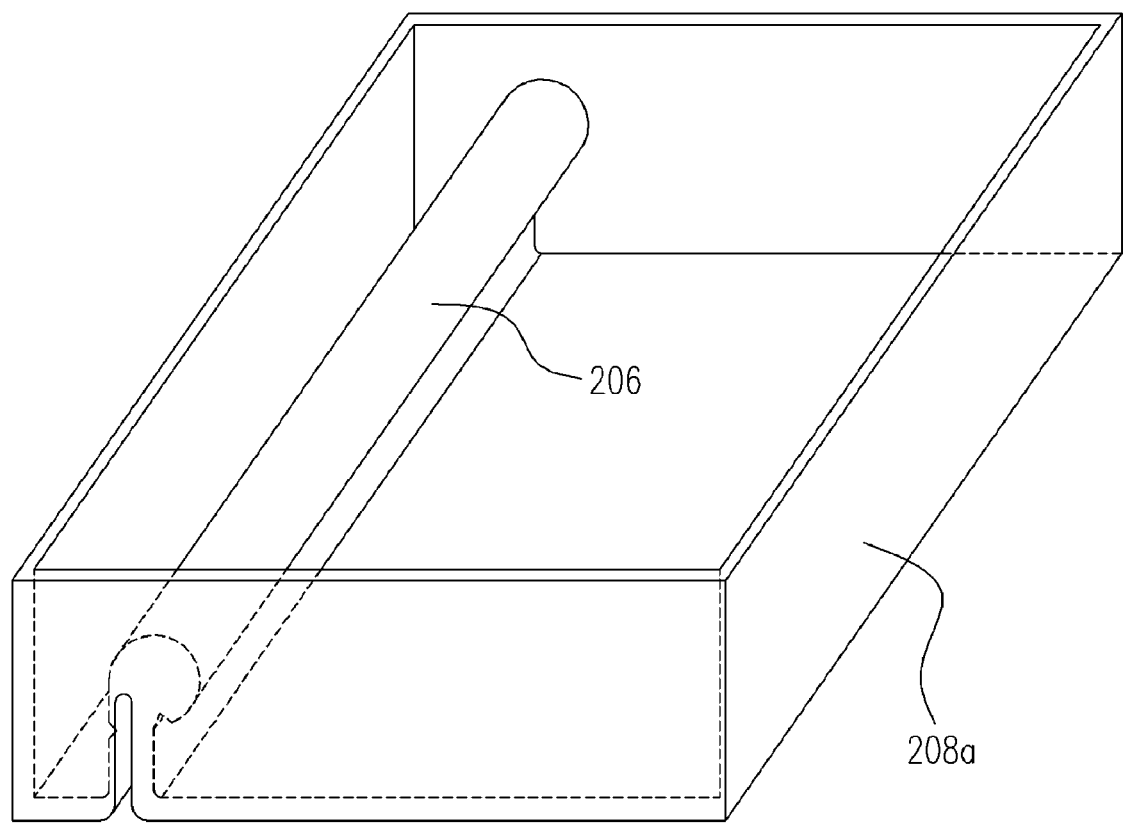
FIG. 5 is a perspective view showing the guiding rail within the lower casing in FIG. 4.
Figure 6:
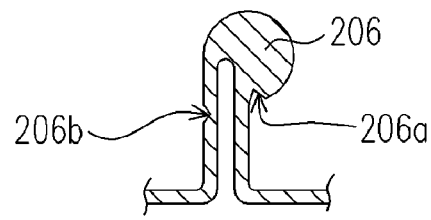
FIG. 6 is a sectional view showing the guiding rail in FIG. 4.
Figure 7:
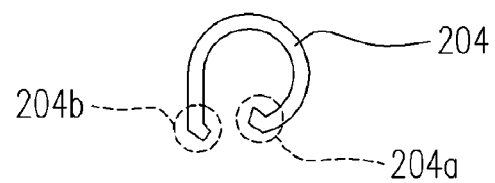
FIG. 7 is a sectional view showing the connecting unit of the carrier in FIG. 4.

In the following, the structure of the guiding rail 206 and the connecting unit 204 of the carrier 202 is explained in more detail. FIG. 5 is a perspective view showing the guiding rail within the lower casing in FIG. 4. FIG. 6 is a sectional view showing the guiding rail in FIG. 4. FIG. 7 is a sectional view showing the connecting unit of the carrier in FIG. 4. In FIG. 5, a guiding rail 206 protruding from the interior sidewall of the lower casing 208b is used as an example. In FIG. 7, the connecting unit 204 of the carrier 202 has at least a protruding section, preferable two protruding sections 204a and 204b. In FIG. 6, the fasteners 206a and 206b in the guiding rail 206 are recess spots for latching with the protruded sections 204a and 204b of the connecting unit 204.

According to one aspect of this invention, the guiding rail is formed as an integral unit together with the casing (unlike the conventional technique having to drill holes at the base stand in the lower casing before stationing the ends of the guiding rail to the base stand). Since the number of assembling step and the demand on assembling tolerance is therefore reduced, some labor and production cost is saved.

According to another aspect of this invention, the fastener on the guiding rail engages with the connecting unit on the carrier by sliding into each other. Hence, the time required to assemble the guiding rail and the carrier is shortened (unlike the conventional technique having to pass the guiding rail through a sheath within the carrier). This saves labor time and reduces production cost considerably.

According to still another aspect of this invention, the guiding rail is formed as an integral unit with the casing. Hence, the possibility of the guiding rail breaking off from the casing due to on-site testing is greatly minimized. In the conventional scanner where only one end of the guiding rail is screwed to a base stand making it more vulnerable to dislodge and drop off during the on-site testing process.

According to still another aspect of this invention, casing (and the guiding rail) is fabricated using a soft and grind-resistant material.

[Modified Example A of the First Embodiment]

According to this invention, the shape of guiding rail and the shape of a matching connecting unit on the carrier need not be limited by the one described above. Other types of design for latching the connecting unit on the carrier and the guiding rail together are possible as long as the carrier is free to slide along the guiding rail.

Figure 8:
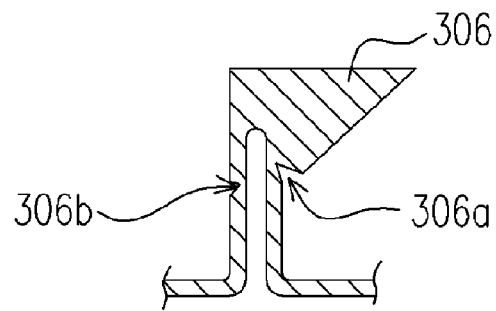
FIG. 8 is a sectional view showing a modified example of the guiding rail according to the first preferred embodiment of this invention.
Figure 9:
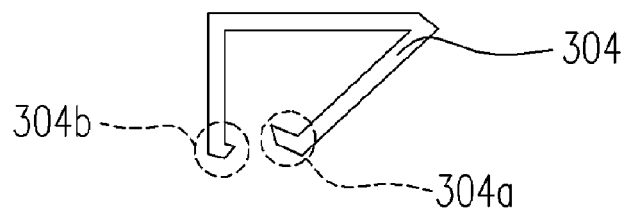
FIG. 9 is a sectional view showing a modified example of the connecting unit of the carrier according to the first preferred embodiment of this invention.

FIG. 8 is a sectional view showing a modified example of the guiding rail according to the first preferred embodiment of this invention. FIG. 9 is a sectional view showing a modified example of the connecting unit of the carrier according to the first preferred embodiment of this invention. In these examples, only the guide rail and the carrier are being modified, while the other elements are same as the first embodiment. As shown in FIG. 8, the guiding rail 306 is formed as an integral unit with the casing. The guiding rail 306 has at least a fastening section but preferably two fastening sections 306a and 306b. The fastening sections 306a and 306b have a recess spot, for example. As shown in FIG. 9, the connecting unit 304 of the carrier has at least a protruding section, but preferably two protruding sections 304a and 304b for engaging with the respective fastening sections 306a and 306b of the fastener 306.

[Modified Example B of the First Embodiment]

Aside from the shape of the guiding rail on the interior sidewall of the casing and the connecting unit, the location of the guiding rail is not limited to the lower casing. In fact, the guiding rail positioned on the bottom section of the lower casing as shown in FIGS. 4 and 5 serves for illustration purpose only. The guiding rail may be formed on the upper casing as well as on the lower casing. The following provides some other modified examples showing the possible location of the guiding rail.

Figure 10:
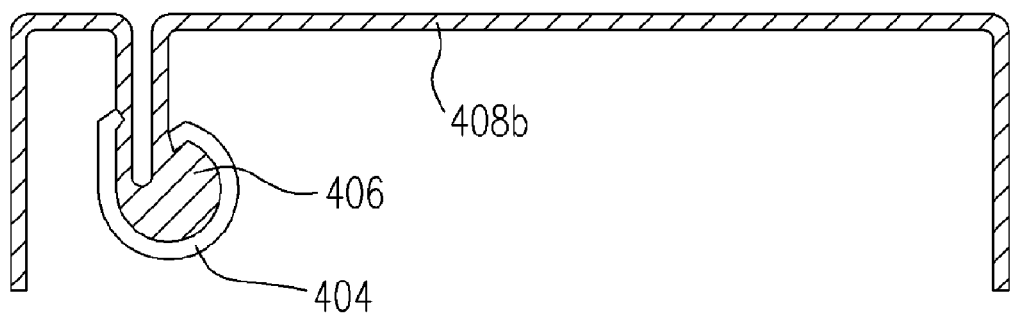
FIGS. 10 through 12 are cross-sectional views showing a guiding rail formed as an integral unit with the top section of an upper casing, the sidewall of an upper casing and the sidewall of a lower casing according to the first preferred embodiment of this invention.
Figure 11:
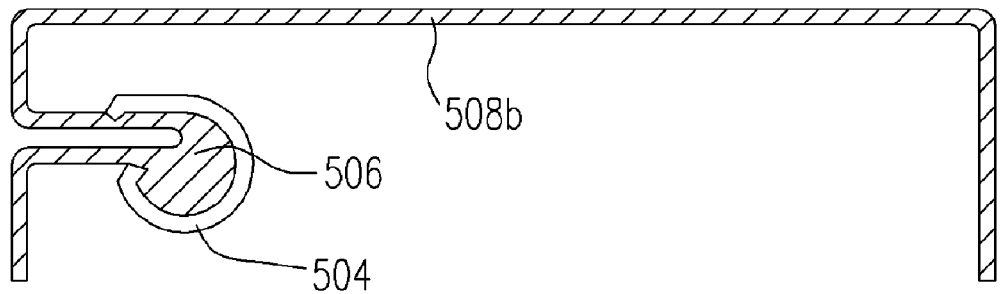
Figure 12:
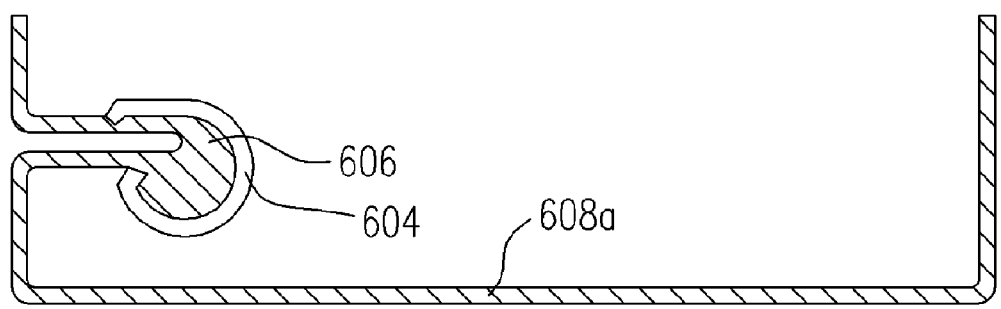
Figure 13:
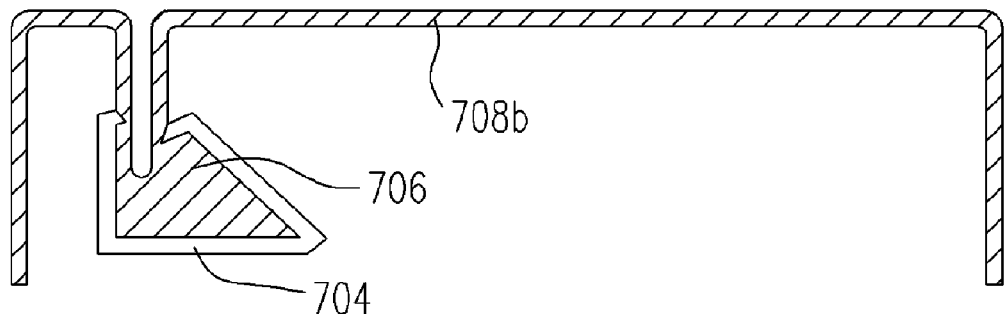
FIGS. 13 through 16 are cross-sectional views showing a guiding rail having the modified example A formed as an integral unit with the top section of an upper casing, the sidewall of an upper casing, the bottom section of a lower casing and the sidewall of a lower casing.
Figure 14:
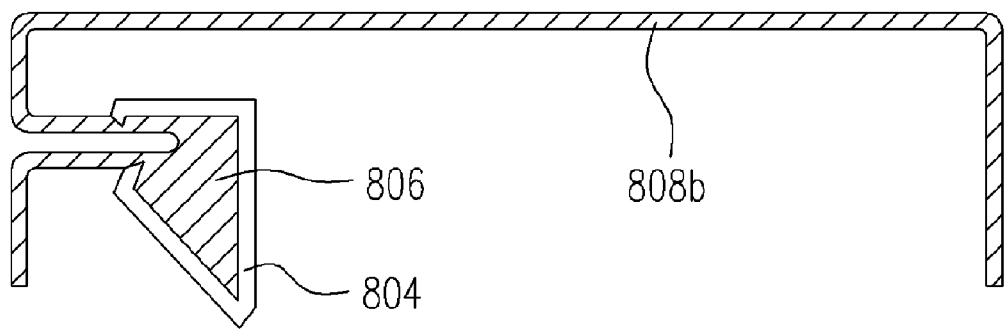
Figure 15:
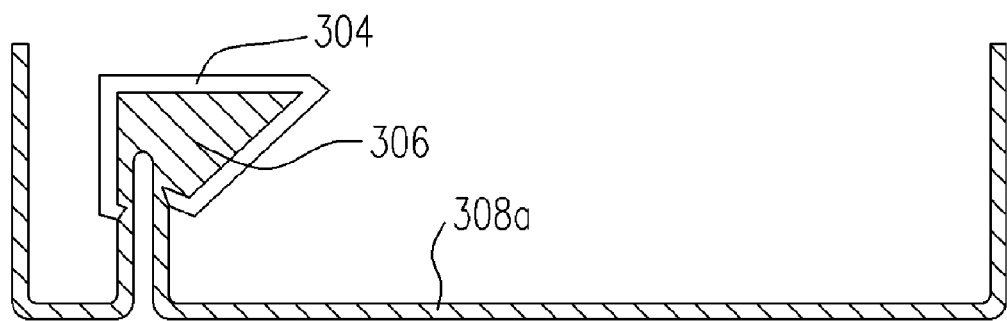
Figure 16:
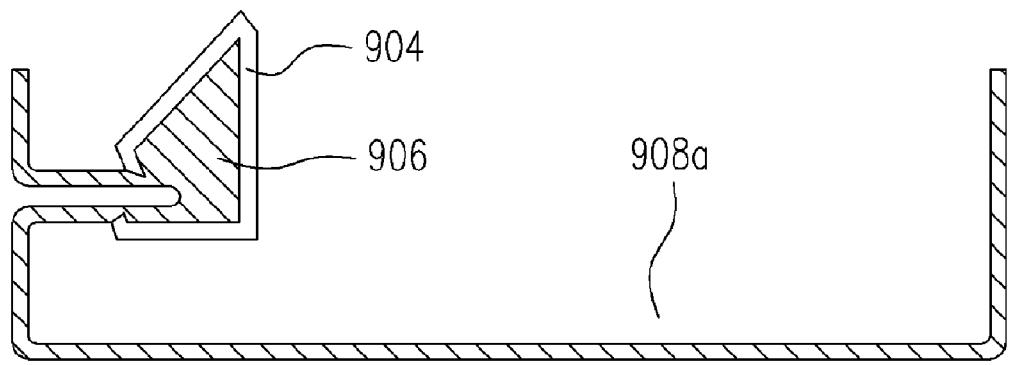

FIGS. 10 through 12 are cross-sectional views showing a guiding rail formed as an integral unit with the top section of an upper casing, the sidewall of an upper casing and the sidewall of a lower casing according to the first preferred embodiment of this invention. As shown in FIGS. 10 through 12, the connecting units of the carrier are labeled 404, 504, 604, the guiding rails are labeled 406, 506, 606, the upper casings are labeled 408b, 508b and the lower casing is labeled 608a.

[Modified Example C of the First Embodiment]

FIGS. 13 through 16 are cross-sectional views showing a guiding rail having the modified example A formed as an integral unit with the top section of an upper casing, the sidewall of an upper casing, the bottom section of a lower casing and the sidewall of a lower casing. As shown in FIGS. 13 through 16, the connecting units of the carrier are labeled 304, 704, 804, 904, the guiding rails are labeled 306, 706, 806, 906, the upper casings are labeled 708b, 808b and the lower casings are labeled 308a, 908a.

Figure 17:
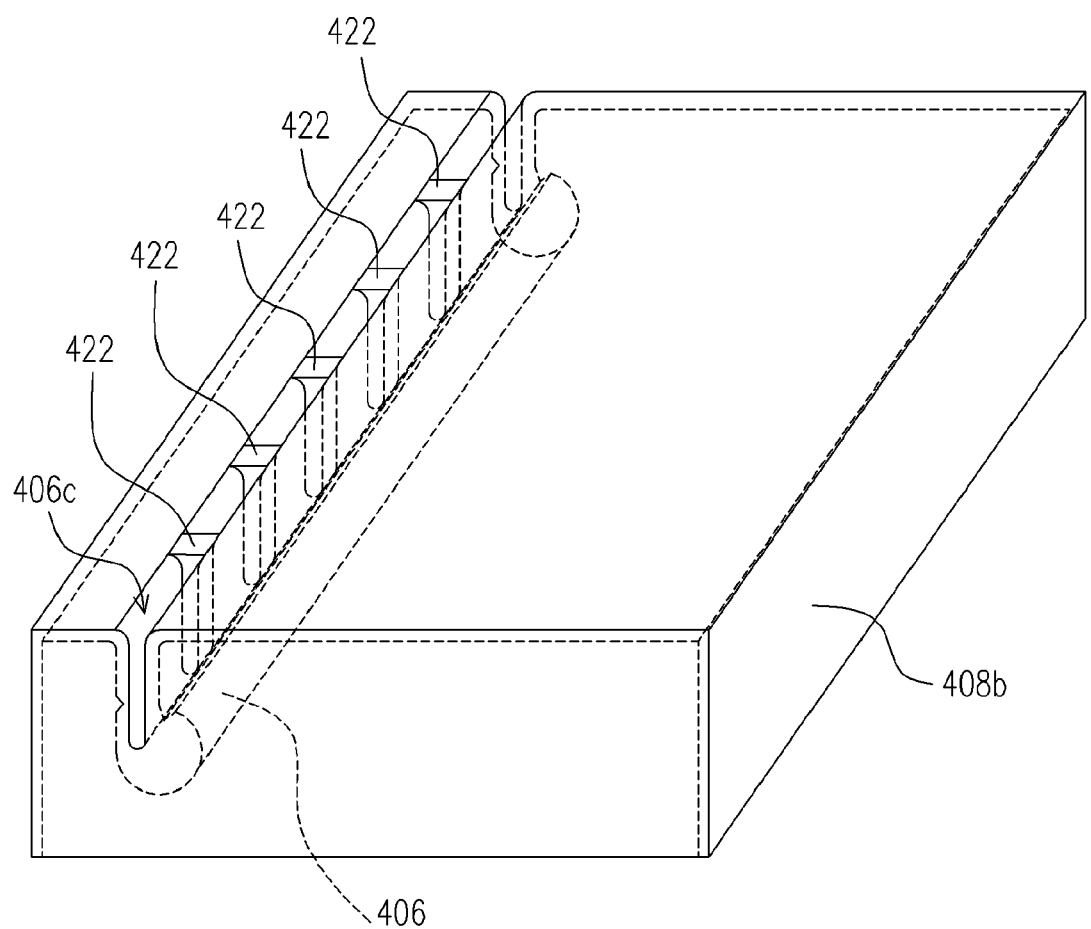
FIG. 17 is a perspective view showing ribs formed in an interior section of the guiding rail.

In addition, ribs may be introduced to strengthen the guiding rail and the casing. FIG. 17 is a perspective view showing ribs formed in an interior section of the guiding rail. As shown in FIG. 17, a plurality of ribs 422 is formed in the U-shaped opening 406c that extends from upper surface of the upper casing 408b towards the guiding rail 406. With the additional ribs 422, the upper casing 408b and the guiding rail 406 are strengthened. To avoid too much complication to the drawing, some dotted lines are omitted, and the lower part of the ribs 422 are shown in dash lines. Although the ribs are formed inside a U-shaped opening within the guiding rail attached to the upper casing 408b, this by no means restricts the location of the ribs.

One aspect of this invention is that the guiding rail can be attached anywhere on the interior wall of the casing. The guiding rail may attach to the top section of the upper casing, the bottom section of the lower casing or the sidewall of the casing. When the guiding rail is attached to the upper casing, a constant distance of separation between the carrier and a scan document is provided. In other words, the distance of separation between the scan document and the optical system on the carrier will be unaffected by the other half of the casing (the lower casing). Ultimately, quality of the scanned image is improved.

Another aspect of this invention is that ribs can be formed inside the U-shaped opening within the guiding rail to strengthen the guiding rail as well as the casing.

[The Second Embodiment]

Figure 18:
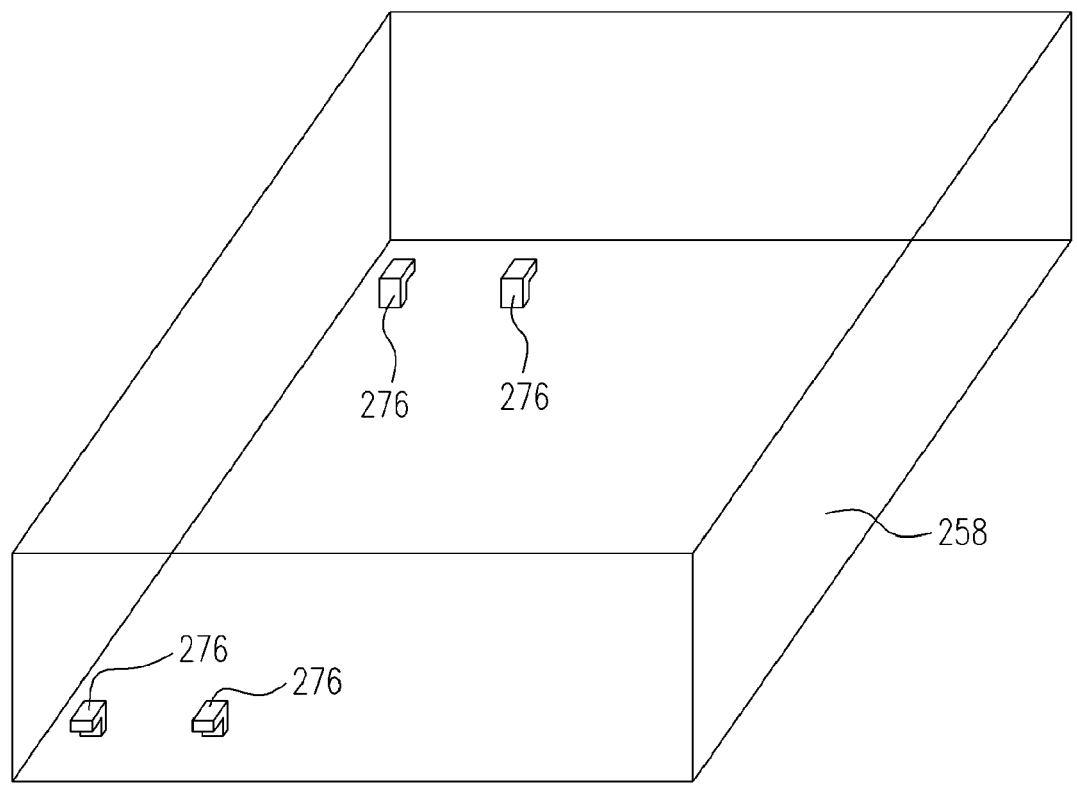
FIG. 18 is a perspective view of a guiding rail according to a second preferred embodiment of this invention.
Figure 19:
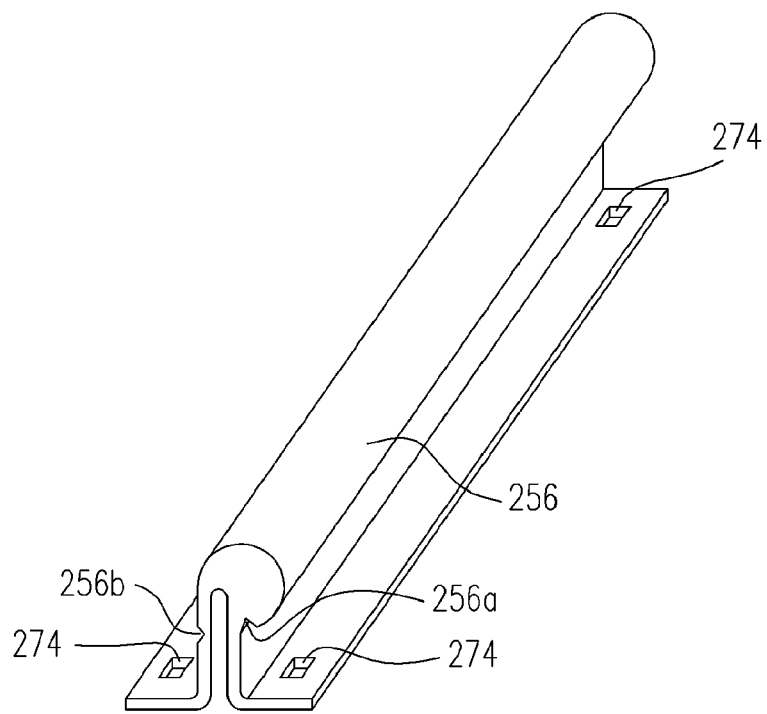
FIG. 19 is a perspective view showing a casing that corresponds with the guiding rail in FIG. 18.

FIG. 18 is a perspective view of a guiding rail according to a second preferred embodiment of this invention. FIG. 19 is a perspective view showing a casing that corresponds with the guiding rail in FIG. 18. In the second embodiment of this invention, all other elements are identical to the ones in the first embodiment except for the casing and the guiding rail. As shown in FIG. 19, the guiding rail 256 has at least two base fastening sections and at least a sliding fastener. Preferably, the guiding rail 256 has four base fastening sections 274 and two sliding fasteners 256a, 256b. Each fixing section 276 is a L-shaped extension from the casing 258 and the base fastening section 274 of the guiding rail 256 is an open hole such that the fixing sections 276 engage (latch) with the base fastening section 274. Therefore, the guiding rail 256 is fixed onto the inner side of the casing 258.

The base fastening sections 274 engage with fixing sections 276 on the casing 258. The sliding fasteners 256a, 256b latch onto the connecting unit of the carrier.

Thus, the second embodiment operates using the same operating principles as the first embodiment. The driving unit (for example, an electric motor) drives a transmission unit (such as a belt) so that the carrier is able to move along the guiding rail 256 through the link between the connecting unit of the carrier and the sliding fasteners 256a, 256b of the guiding rail 256.

In addition, the scope of this invention sets no limit either to the shape of the guiding rail and the corresponding connecting unit on the carrier or the location of the guiding rail. Since many variations are possible, only a few are described above. Furthermore, it is possible to strength the guiding rail by forming ribs inside the U-shaped opening within the guiding rail.

Accordingly, one aspect of this invention is that the sliding fasteners of the guiding rail fit easily into the corresponding connecting unit on the carrier. Therefore, overall assembly time is saved (unlike the conventional technique having to drill holes at the base stand in the lower casing before stationing the ends of the guiding rail to the base stand). Consequently, some labor and production cost is saved.

Another aspect of this invention is that the fastening method constrains the movement of the carrier along the guiding rail. Hence, the guiding rail is less vulnerable to drop while performing an on-site testing (unlike the conventional guiding rail that can be shaken loose because only one end is fastened using a screw).

Still another aspect of this invention is that ribs may be added to the U-shaped opening in the interior of the guiding rail to further strengthen the guiding rail.

Still another aspect of this invention is that the guiding rail is fabricated using a soft and grind-resistant material.

According to the aforementioned embodiments, major advantages of this invention includes: 1. By forming the guiding rail on the casing as an integral unit, the number of assembling steps is reduced and the demand on assembling tolerance is also reduced. Hence, labor and production cost can be substantially reduced. 2. Because the fastening section of the guiding rail and the connecting unit of the carrier can be assembled together with ease, and therefore assembling time and production cost can be substantially reduced. 3. Since the guiding rail is formed as an integral unit inside the casing, the possibility of the guiding rail breaking off from the casing while performing an on-site testing is greatly reduced. 4. The guiding rail can be fixed onto the interior wall of the casing through latching (engaging) so that the dropping of the guiding rail from the casing while performing an on-site testing as in the case of conventional scanner can be effectively avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical scanner, comprising:
    a carrier having a connecting unit and an optical system mounted thereon;
    a casing having a guiding rail, wherein the guiding rail is formed on an interior wall of the casing as an integral unit and the guiding rail has at least a fastener capable of latching with the connecting unit of the carrier;
    a driving unit;
    a transmission unit capable of coupling the driving unit and the carrier, the driving unit capable of driving the transmission unit to pull the carrier to move along the guide rail through the connecting unit of the carrier and the fastener of the guide rail;
    wherein the guiding rail comprises a section protruding from the interior wall of the casing; and
    wherein the guiding rail has a substantially U-shaved opening section having a plurality of ribs set at predetermined intervals inside the opening section.

2. The optical scanner of claim 1, wherein the connecting unit of the carrier has at least a protruding section and the fastener of the guiding rail has a recess section capable of engaging with the protruding section of the connecting unit.

3. The optical scanner of claim 1, further comprising: a set of reflecting mirrors, a lens and an optical sensor.

4. The optical scanner of claim 3, wherein the optical sensor comprises a charge couple device.

5. The optical scanner of claim 1, wherein material constituting the casing comprises a soft and grind-resistant material.

6. The optical scanner of claim 5, wherein the soft and grind-resistant material comprises one or more of the following: polycarbonate resin, nylon, polyoxymethylene or polybutylene terephthalate.

7. An optical scanner, comprising:
    a carrier having a connecting unit and an optical system mounted thereon;
    a casing having at least two fixing sections on an interior wall of the casing;
    a guiding rail having at least two base fastening sections and at least a sliding fastener, the base fastening sections of the guiding rail capable of latching onto the respective fixing sections of the casing and the sliding fastener capable of latching onto the connecting unit of the carrier;
    a driving unit; and
    a transmission unit capable of coupling the driving unit and the carrier, the driving unit capable of driving the transmission unit to pull the carrier to move along the guide rail through the connecting unit of the carrier and the sliding fastener of the guide rail.

8. The optical scanner of claim 7, wherein material constituting the casing comprises a soft and grind-resistant material.

9. The optical scanner of claim 7, wherein the soft and grind-resistant material comprises one or more of the following: polycarbonate resin, nylon, polyoxymethylene or polybutylene terephthalate.

10. The optical scanner of claim 7, wherein the guiding rail has a substantially U-shaped opening section having a plurality of ribs set at predetermined intervals inside the opening capable of connecting sidewalls of the opening capable of strengthening the guiding rail.

11. The optical scanner of claim 7, wherein the connecting unit of the carrier has at least a protruding section and the sliding fastener of the guiding rail has a recess section capable of engaging with the protruding section of the connecting unit.

12. The optical scanner of claim 7, wherein the fixing section is a substantially L-shaped extension from the casing and the at least two base fastening sections of the guiding rail is an open hole such that the at least two base fastening sections latch onto the fixing section to attach the guiding rail to the casing.

13. The optical scanner of claim 7, wherein the guiding rail is engaged to the interior wall of the casing.

14. The optical scanner of claim 7, wherein the optical system further comprises a set of reflecting mirrors, a lens and an optical sensor.

15. The optical scanner of claim 14, wherein the optical sensor comprises a charge couple device.

16. An optical scanner, comprising:
    a carrier having a connecting unit, wherein the carrier has an optical system mounted thereon;

a casing having a guiding rail, wherein the guiding rail is formed on an interior wall of the casing as an integral unit and the guiding rail has at least a fastener capable of latching with the connecting unit of the carrier; and wherein the guiding rail comprises a section protruding from the interior wall of the casing, and wherein the guiding rail has a substantially U-shaped opening section having a plurality of ribs set at predetermined intervals inside the opening section.

17. The optical scanner of claim 16, wherein the connecting unit of the carrier has at least a protruding section and the fastener of the guiding rail has a recess section capable of engaging with the protruding section of the connecting unit.

* * * * *

UNITED STATES PATENT AND TRADEMARK OFFICE
CERTIFICATE OF CORRECTION

PATENT NO. : 7,225,985 B2  Page 1 of 1
APPLICATION NO. : 10/604343
DATED : June 5, 2007
INVENTOR(S) : Chang It is certified that error appears in the above-identified patent and that said Letters Patent is hereby corrected as shown below:

At claim 1 please replace "1. An optical scanner, comprising: a carrier having a connecting unit and an optical system mounted thereon; a casing having a guiding rail, wherein the guiding rail is formed on an interior wall of the casing as an integral unit and the guiding rail has at least a fastener capable of latching with the connecting unit of the carrier; a driving unit; a transmission unit capable of coupling the driving unit and the carrier, the driving unit capable of driving the transmission unit to pull the carrier to move along the guide rail through the connecting unit of the carrier and the fastener of the guide rail; wherein the guiding rail comprises a section protruding from the interior wall of the casing; and wherein the guiding rail has a substantially U-shaved opening section having a plurality of ribs set at predetermined intervals inside the opening section."

with

--1. An optical scanner, comprising: a carrier having a connecting unit and an optical system mounted thereon; a casing having a guiding rail, wherein the guiding rail is formed on an interior wall of the casing as an integral unit and the guiding rail has at least a fastener capable of latching with the connecting unit of the carrier; a driving unit; a transmission unit capable of coupling the driving unit and the carrier, the driving unit capable of driving the transmission unit to pull the carrier to move along the guide rail through the connecting unit of the carrier and the fastener of the guide rail; wherein the guiding rail comprises a section protruding from the interior wall of the casing; and wherein the guiding rail has a substantially U-shaped opening section having a plurality of ribs set at predetermined intervals inside the opening section.--

Signed and Sealed this

Twenty-eighth Day of October, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,225,985 B2 | |
| APPLICATION NO. | : 10/604343 | |
| DATED | : June 5, 2007 | |
| INVENTOR(S) | : Chang | |

It is certified that error appears in the above-identified patent and that said Letters Patent is hereby corrected as shown below:

Column 7, lines 50-67
At claim 1 please replace "1. An optical scanner, comprising: a carrier having a connecting unit and an optical system mounted thereon; a casing having a guiding rail, wherein the guiding rail is formed on an interior wall of the casing as an integral unit and the guiding rail has at least a fastener capable of latching with the connecting unit of the carrier; a driving unit; a transmission unit capable of coupling the driving unit and the carrier, the driving unit capable of driving the transmission unit to pull the carrier to move along the guide rail through the connecting unit of the carrier and the fastener of the guide rail; wherein the guiding rail comprises a section protruding from the interior wall of the casing; and wherein the guiding rail has a substantially U-shaved opening section having a plurality of ribs set at predetermined intervals inside the opening section."

UNITED STATES PATENT AND TRADEMARK OFFICE
CERTIFICATE OF CORRECTION

PATENT NO.       : 7,225,985 B2
APPLICATION NO. : 10/604343
DATED            : June 5, 2007
INVENTOR(S)      : Chang It is certified that error appears in the above-identified patent and that said Letters Patent is hereby corrected as shown below:

with

--1. An optical scanner, comprising: a carrier having a connecting unit and an optical system mounted thereon; a casing having a guiding rail, wherein the guiding rail is formed on an interior wall of the casing as an integral unit and the guiding rail has at least a fastener capable of latching with the connecting unit of the carrier; a driving unit; a transmission unit capable of coupling the driving unit and the carrier, the driving unit capable of driving the transmission unit to pull the carrier to move along the guide rail through the connecting unit of the carrier and the fastener of the guide rail; wherein the guiding rail comprises a section protruding from the interior wall of the casing; and wherein the guiding rail has a substantially U-shaped opening section having a plurality of ribs set at predetermined intervals inside the opening section.--

This certificate supersedes the Certificate of Correction issued October 28, 2008.

Signed and Sealed this

Twenty-fifth Day of November, 2008

JON W. DUDAS
*Director of the United States Patent and Trademark Office*